Feb. 5, 1952   C. E. NAEKEL   2,584,396
LOADING AND UNLOADING CHUTE FOR VEHICLES
Filed Aug. 15, 1949   2 SHEETS—SHEET 1
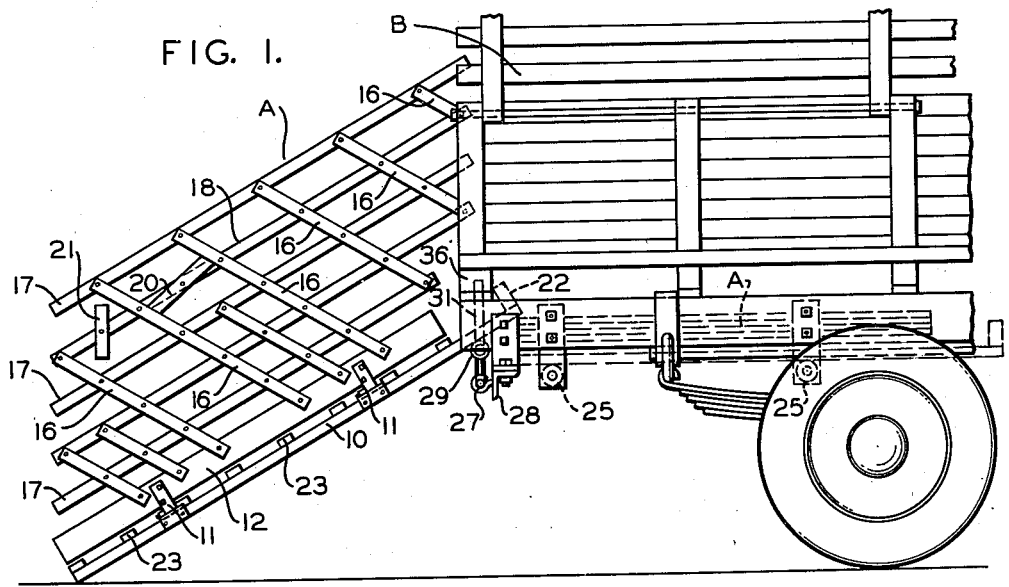
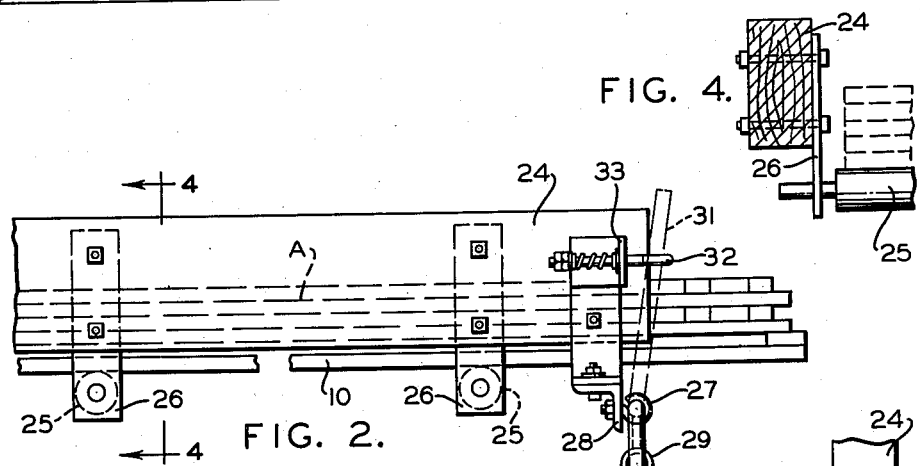
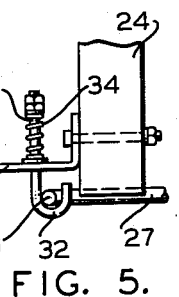
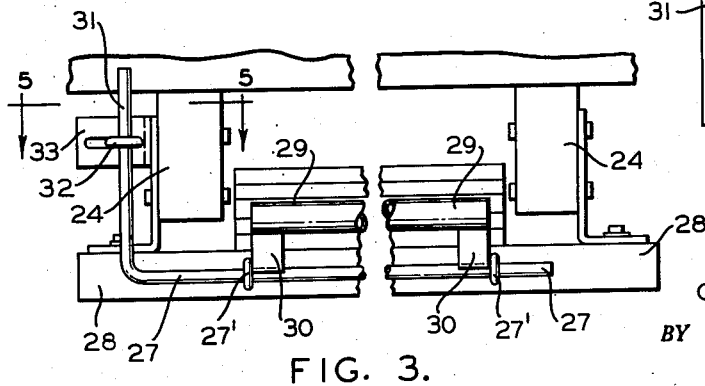
INVENTOR.
CHARLES E. NAEKEL
BY
ATTORNEY Feb. 5, 1952           C. E. NAEKEL           2,584,396
LOADING AND UNLOADING CHUTE FOR VEHICLES
Filed Aug. 15, 1949           2 SHEETS—SHEET 2
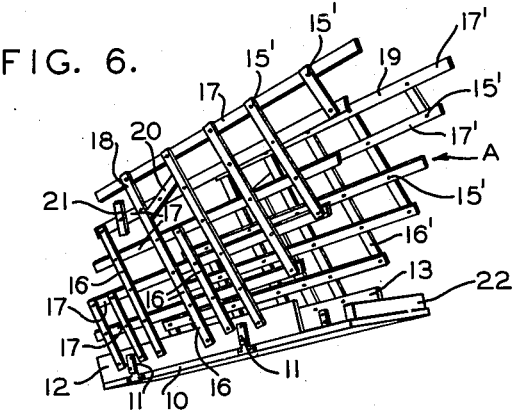
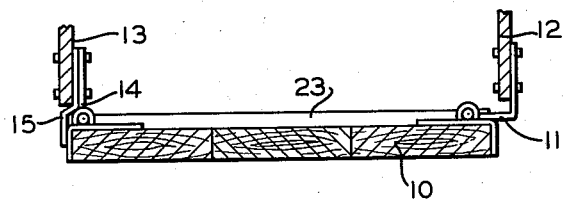
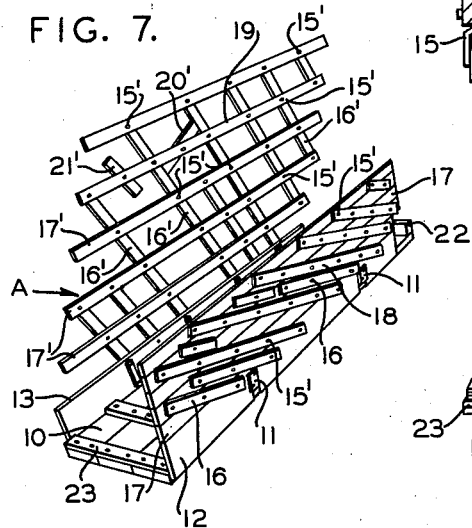
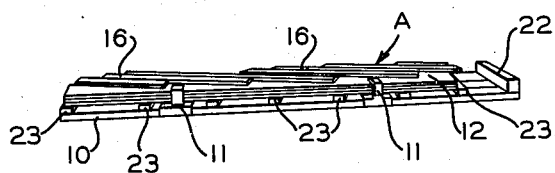
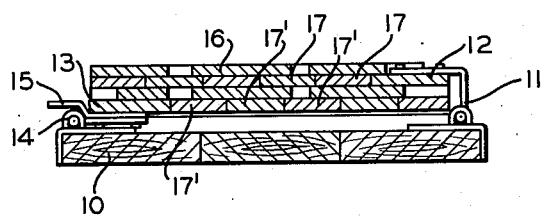
*INVENTOR.*
CHARLES E. NAEKEL
BY
ATTORNEY Patented Feb. 5, 1952

2,584,396

UNITED STATES PATENT OFFICE 2,584,396

LOADING AND UNLOADING CHUTE FOR VEHICLES

Charles E. Naekel, Valley City, N. Dak.

Application August 15, 1949, Serial No. 110,440

5 Claims. (Cl. 214—85)

My invention relates to an improvement in a collapsible chute particularly used in loading and unloading livestock to and from a truck.

It is a primary object of my invention to provide a loading and unloading chute which is adapted to be easily collapsed and folded and which, in a folded position, may be placed under the rear floor of the back of a truck.

It is a further feature of my invention to provide side walls for my chute which are adapted to be collapsed and folded into a compact space one upon the other in a folded position upon the ramp of the chute. It is also a feature to provide locking bars so that the adjustable expandable side walls of the chute may be positioned at various heights depending upon the type of livestock being loaded or unloaded into and from a truck in conjunction with which the chute is used.

It is a further object of my invention to provide a hinged stop bar on the rear of the truck which is adapted to hold the chute as a unit from sliding from the truck when the chute is hidden from view between the longitudinal sills of the truck underneath the floor thereof in position for carrying the same. The hinged stop bar also secures the upper end of the ramp in position when the chute unit is in position for loading or unloading.

It is a primary object of my invention to provide a chute which may be collapsed and folded and maintained in position under the floor of a truck, it being highly objectionable to maintain a chute on the outer side surfaces or end of the truck.

In the drawings forming part of the specification:

Figure 1 is a side elevational view of my loading and unloading chute set up for use on the rear end of a truck, only a portion of the truck being shown.

Figure 2 is a side elevational view of a portion of the longitudinal sill of a truck with my chute unit (shown in dotted lines) in position between the sills with a portion thereof extending beyond the rear end of the sills and the hinged stop bar shown in an open downward position, the stop bar shown in an upward closed position in dotted lines.

Figure 3 is a broken view of the rear end of a portion of a truck with my chute unit positioned thereunder, the stop bar unit in operative position.

Figure 4 is a partial sectional view on the line 4—4 of Figure 2.

Figure 5 is a view on the line 5—5 of Figure 3.

Figure 6 is a perspective view of my chute unit with both sides fully extended and set up for use.

Figure 7 is a perspective view of my chute with one of the sides partially extended and secured, the other side in a collapsed position.

Figure 8 is a partial transverse sectional view of the ramp and side walls of my chute, illustrating the hinges.

Figure 9 is a perspective view of my chute in a collapsed folded position.

Figure 10 is a transverse sectional view of my chute.

My chute unit A is composed of the ramp floor 10 to which is secured the offset hinges 11. The hinges 11 are in turn secured to the longitudinal base wall member 12. The longitudinal base wall member 13 is hinged to the ramp floor 10 by means of the hinges 14. The hinges 14 are restricted from opening further than 90 degrees by means of the stop members 15 which are secured beneath a portion of the hinge 14 and which contact the side of the floor ramp 10 when the hinges are opened 90 degrees. The longitudinal base wall member 12 has pivoted thereto the spaced-apart folding bar members 16. Pivoted with the folding members 16 are the longitudinal side wall members 17 which, due to their pivoted connections 15' with the folding pivoted bar members 16, remain in a parallel condition one with the other and also with the base wall member 12, and also due to their pivoted construction the side wall 18 may be thereby folded so that the longitudinal side wall members 17 will rest one upon the other with the lowermost of same resting on the base wall member 12.

The base wall member 13 also has a series of spaced-apart pivoted folding bar members 16'. The pivoted folding bar members 16' have pivoted thereto a series of longitudinal side wall members 17' which are parallel one to the other, the series of which are maintained in parallel relation to the base wall longitudinal member 13, all of which form the wall 19 which is virtually the same as the wall 18. The walls 18 and 19 are somewhat like "lazy tongs" in construction. Pivoted to one of the members 17 is the locking bar 20. This bar 20 is of such a length that when it is positioned at right angles to the folding members 16 it thereby forms a lock and collapsing of the wall 18 is thereby prohibited. A pivoted locking bar 21 is also pivoted to one of the members 17 which is similar to the bar 20 but of less length and thus the wall 18 may be maintained and locked in position at a less height (as illustrated in Figure 7) by placing the pivoted locking bar 21', as the bar 20 is placed, to secure the wall 19 in a lower upright position. The wall 19 is provided with the locking bars 20' and 21' which are similar to the pivoted locking bars 20 and 21. With the locking bars 20 and 21 in a position so that they are parallel to the pivoted folding members 16, the chute wall 18 may be collapsed to the position shown in Figure 7. The wall 19 is collapsed in the same manner. The wall 19 in a collapsed position may be folded upon the floor ramp 10 by means of the hinge 14. The collapsed wall 18 is then folded upon the wall 19 by means of the offset hinge 11 which allows the wall 18 to rest above and upon the wall 19, thus providing a compact unit which may be placed in position under the rear floor of a truck is hereinafter described.

The upper end of the ramp floor 10 is provided with a transverse bar member 22 which is adapted to engage the rear cross member of a truck as hereinafter described. The floor ramp 10 of the chute A is also provided with cross members 23 to give a non-slip surface to the floor ramp 10.

The longitudinal sill members 24 of the truck B are provided with the rollers 25 which are rotatably secured to the strap support members 26, the strap support members 26 being secured to the longitudinal sill members 24 of the truck B. The rollers 25 are positioned so that the collapsed and folded chute A, as shown in Figure 9, may be slid into position between the sills 24 by rolling the same on the rollers 25 so that the chute unit A is concealed beneath the floor of a truck and between the sills 24 supported upon the rollers 25.

To maintain the chute A in position between the sills 24, I provide the rod 27 which is pivoted to the transverse support bar 28 by means of the eyes 27', the transverse support bar 28 being secured to the rear end of the sills 24. The rod 27 has formed thereon the rightangular handle portion 31. The pivoted tubular stop member 29 is secured to the pivoted rod 27 by means of the connection supports 30. The hinged tubular stop member 29 is maintained in the position shown in Figures 1 and 3 by securing the handle member 31 within the hook 32, said hook 32 being secured to the bracket 33 and adapted to be extended from said bracket by means of the spring 34 attached to the shaft portion 35 which extends through the bracket 33 and is part of the hook end 32. With the handle 31 in the position shown in Figures 1 and 3 and the tubular stop member 29 in the position shown in these figures, the collapsed folded chute A in position between the sills 24 is thereby prevented from coming out of the rear end of the truck from the compartment formed between the sills 24.

In removing the chute A from between the sills 24, the handle 31 is disengaged from the hook 32 and allowed to assume the depending position shown in Figure 2 so that the tubular stop member 29 is out of the way of the chute A, and the chute may be removed from between the sills of the truck B, utilizing the rollers 25. In using the chute A, the same is not pulled entirely from the truck, but with the chute almost free of the sills 24, the transverse bar 22 is allowed to engage the inner side of the transverse floor support member 36 of the truck B as the ramp floor 10 is allowed to rest on the ground on its lower end. The cross bar member 22 is held upwardly in position and against the transverse member 36 by raising the handle 31 to the position shown in Figure 3 and engaging the same in the hook 32. As a result, the tubular stop member 29 is forced upwardly into contact with the under side of the ramp floor 10 and at the same time the ramp floor is pushed upwardly so that the cross bar member 22 engages the inner side of the transverse truck member 36. In this position the ramp floor 10 cannot be moved from the truck B. Thus the tubular stop member 29 provides a stop member for the chute in a folded position between the sills 24 of the truck B and also a support member for the ramp floor 10 and the proper positioning of the cross bar 22.

In using the chute A, the next step is to raise the side 18 to a vertical position and then raise the side 19 likewise. The sides 18 and 19 may then be extended upwardly and locked in position by means of the pivoted locking bars 20 and 20' or 21 and 21' depending upon the height of the chute desired. The walls 18 and 19 cannot assume more than a 90 degree position with regard to the ramp floor 10 due to the construction of the hinges 11 and 14 hereinbefore described. The walls 18 and 19 may be maintained in an upright position for use by securing the upper ends of the same to the sides of the door opening of the truck B against which they are positioned, thus preventing the walls 18 and 19 from falling toward each other.

I claim:

1. In a collapsible livestock chute, a ramp, a transverse bar member secured to the upper end of said ramp, base side wall members hinged to the side edges of said ramp, a series of parallel obliquely positioned folding side members the lower ends of which are pivotally secured to each of said base wall members, a series of longitudinal side members pivotally secured to said folding side members maintained in parallel relation to said base side wall members, a locking bar pivoted to one of said folding side members the ends of which are adapted to engage the opposing edges of two of said parallel folding side members when said side members are separated to hold the same apart and thereby maintain said longitudinal side members in extended position to form walls on said ramp, one of said base walls having offset hinges whereby said wall in a collapsible position may be folded over the said other collapsed wall folded upon said ramp.

2. A collapsible livestock chute unit having a floor ramp member, collapsible sidewalls in lazy tong formation hingedly supported to the side edges of said floor member in a manner to be folded onto said floor, one wall above the other.

3. In a loading and unloading chute, a floor ramp, a series of folding side bars hingedly secured to each edge of said floor ramp in oblique position thereto, a series of parallel longitudinal bar members pivoted to each of said folding side bars, locking bar means pivoted to one of said longitudinal bar members adapted to engage with the opposing edges of a pair of said folding side bars to hold said longitudinal bar members extended and apart to form ramp walls, bar means secured to said floor ramp adapted to engage the transverse floor support member of a vehicle.

4. In combination with a transverse support member and longitudinal sills of a vehicle, a loading and unloading chute including a ramp floor, base side wall members hinged to the side edges of said ramp, a series of parallel folding side members positioned in oblique relation to said base side wall members, the lower ends of which are pivotally secured to each of said base wall members, a series of longitudinal side members pivotally secured to said folding side members maintanied in parallel relation to said base side wall members, a locking bar pivoted to one of said side members, the ends of which are adapted to engage the opposing edges of two of said longitudinal side members to hold the same apart and maintain said longitudinal side members in extended position, a transverse securing bar secured to said ramp floor adapted to engage said vehicle transverse support member between said sills, a pivoted bar member secured to the rear end of said sills, means for positioning said pivoted bar member in an upward position beneath said floor of said ramp to position said transverse securing bar against said transverse support member of said vehicle, and means for supporting said chute in a folded collapsed position between said sills of said vehicle.

5. In a collapsible livestock chute, a ramp floor, a longitudinal base side wall member hingedly secured to each edge of said ramp floor, a series of standards pivotally mounted on each of said longitudinal base side wall members, a series of parallel longitudinal side wall members pivotally secured to said standards to maintain parallel relation to each other and said longitudinal base side wall member and form a pair of ramp walls, a locking bar pivoted to one of said standards of each of said walls the ends of said bars adapted to engage the opposing edges of any of a pair of said standards to maintain said parallel longitudinal side wall members in spaced apart relation.

CHARLES E. NAEKEL.

REFERENCES CITED

The following references are of record in the file of this patent:

UNITED STATES PATENTS

| Number | Name | Date |
|---|---|---|
| 1,383,080 | Deno et al. | June 28, 1921 |
| 1,758,372 | Pflaum | May 13, 1930 |
| 1,782,554 | Tool | Nov. 25, 1930 |
| 2,228,946 | Carter | Jan. 14, 1941 |